United States Patent
Schwiebert et al.

(10) Patent No.: US 12,045,922 B2
(45) Date of Patent: Jul. 23, 2024

(54) SYSTEMS AND METHODS FOR CONVERTING COMPOSITE IMAGE DATA

(71) Applicant: Canva Pty Ltd, Surry Hills (AU)

(72) Inventors: Stephan Schwiebert, Sydney (AU); Velislava Yanchina, Byron Bay (AU); Henrry Eduardo Iguaro Jaramillo, Sydney (AU)

(73) Assignee: CANVA PTY LTD, Surry Hills (AU)

( * ) Notice: Subject to any disclaimer, the term of this patent is extended or adjusted under 35 U.S.C. 154(b) by 162 days.

(21) Appl. No.: 17/721,960

(22) Filed: Apr. 15, 2022

(65) Prior Publication Data

US 2022/0343572 A1     Oct. 27, 2022

(30) Foreign Application Priority Data

Apr. 23, 2021   (AU) ................................ 2021202516

(51) Int. Cl.
*G06T 11/60*     (2006.01)
(52) U.S. Cl.
CPC .......... *G06T 11/60* (2013.01); *G06T 2210/12* (2013.01)
(58) Field of Classification Search
CPC ..... G06F 17/16; G06T 2210/12; G06T 11/40; G06T 11/60
See application file for complete search history.

(56) References Cited

U.S. PATENT DOCUMENTS

| | | | |
|---|---|---|---|
| 2006/0244751 A1* | 11/2006 | Kitora | G06V 10/44 345/501 |
| 2012/0017142 A1* | 1/2012 | Nagao | G06F 16/739 715/211 |
| 2016/0034232 A1* | 2/2016 | Bhatia | G06F 3/1228 358/1.14 |
| 2021/0312232 A1* | 10/2021 | Tensmeyer | G06F 18/2148 |

\* cited by examiner

*Primary Examiner* — Phi Hoang
(74) *Attorney, Agent, or Firm* — GrowIP Law Group LLC

(57) ABSTRACT

Described herein is a computer implemented method for processing a set of operations including one or more vector type operations. The method includes processing the set of operations to generate one or more corresponding page elements for an editable document by: calculating an expanded bounding box for each vector type operation in the set of operations; associating each vector type operation with a subgroup, wherein a given subgroup is associated with one or more vector type operations which have collectively overlapping expanded bounding boxes; and processing each subgroup to generate a corresponding page element, wherein the page element corresponding to a given subgroup comprises drawing data based on each vector type operation associated with the given subgroup.

20 Claims, 8 Drawing Sheets

SYSTEMS AND METHODS FOR CONVERTING COMPOSITE IMAGE DATA

CROSS-REFERENCE TO RELATED APPLICATION

This application is a U.S. Non-Provisional Application that claims priority to Australian Patent Application No. 2021202516, filed Apr. 23, 2021, which is hereby incorporated by reference in its entirety.

FIELD

The present disclosure is directed to systems and methods for converting composite image data to an editable document format data.

BACKGROUND

As used in this specification, composite image data is data that includes graphics in both vector and raster format. The portable document format (PDF) is one example of a commonly used composite image data format, and is used for storing, communicating, and displaying documents.

While useful for displaying documents, the nature of the PDF is such that editing documents encoded as PDF data can be complex and unwieldy.

This becomes an issue when a user wishes to import PDF data—whether an entire PDF document, a single page of a PDF document, or an arbitrary selection of content from a PDF document—into an editor with a view to editing that data. At this point the original PDF data format will often not be at all conducive to being edited in an efficient or intuitive way.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY

Described herein is a computer implemented method comprising: accessing, by a computer system comprising a processing unit, composite image data; processing the composite image data to generate an ordered stream of input operations, the ordered stream of input operations comprising vector type operations and raster type operations; creating a set of page elements for an editable document by: processing the ordered stream of input operations by, for each input operation: determining a type of the input operation; in response to determining that the input operation is a vector type operation, appending the vector type operation to an operations buffer; and in response to determining that the input operation is a raster type operation: flushing the operations buffer; creating a raster page element corresponding to the raster type operation; and appending the raster page element to the set of page elements; and wherein flushing the operations buffer comprises: processing one or more vector type operations in the operations buffer to generate one or more corresponding page elements; appending the one or more corresponding page elements to the set of page elements; and clearing the one or more vector type operations from the operations buffer.

Also described herein is a computer implemented method comprising: accessing, by a computer system comprising a processing unit, a set of operations, the set of operations comprising one or more vector type operations; processing the set of operations to generate one or more corresponding page elements for an editable document by: calculating an expanded bounding box for each vector type operation in the set of operations; associating each vector type operation with a subgroup, wherein a given subgroup is associated with one or more vector type operations which have collectively overlapping expanded bounding boxes; and processing each subgroup to generate a corresponding page element, wherein the page element corresponding to a given subgroup comprises drawing data based on each vector type operation associated with the given subgroup.

BRIEF DESCRIPTION OF THE DRAWINGS

Preferred embodiments of the invention will be described, by way of examples only, with reference to the accompanying representations, wherein.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The present disclosure is generally concerned with processing what will be referred to as composite image data. As used in this specification, composite image data is data that includes graphics in both vector format and raster format. One example vector format is the scalable vector graphic (SVG) format, though others exist. Example raster formats include the portable network graphic (PNG) format, bitmap format, JPEG format, though others exist.

The Portable Document Format (PDF) is an example of a composite image data format and will be used to describe the various features and techniques of the present disclosure. The PDF is standardised and described in ISO 32000 (e.g. ISO 32000-2). In many situations users may wish to import content formatted as PDF data into an editing application so that content can be edited. Typically, however, the PDF in its native format is not conducive to editing.

Generally speaking, PDF data defines paths via path construction operators—e.g.: 'm' (which begins a new subpath at a defined (x,y) coordinate pair); 'l' (which appends a straight line from the end of the current path point to a new (x,y) coordinate pair); 'c', 'v', and 'y' (each of which append a cubic Bezier curve with defined parameters from the end of the current path to a new (x,y) coordinate pair); and 'h' (to close the current subpath).

Figure 1:
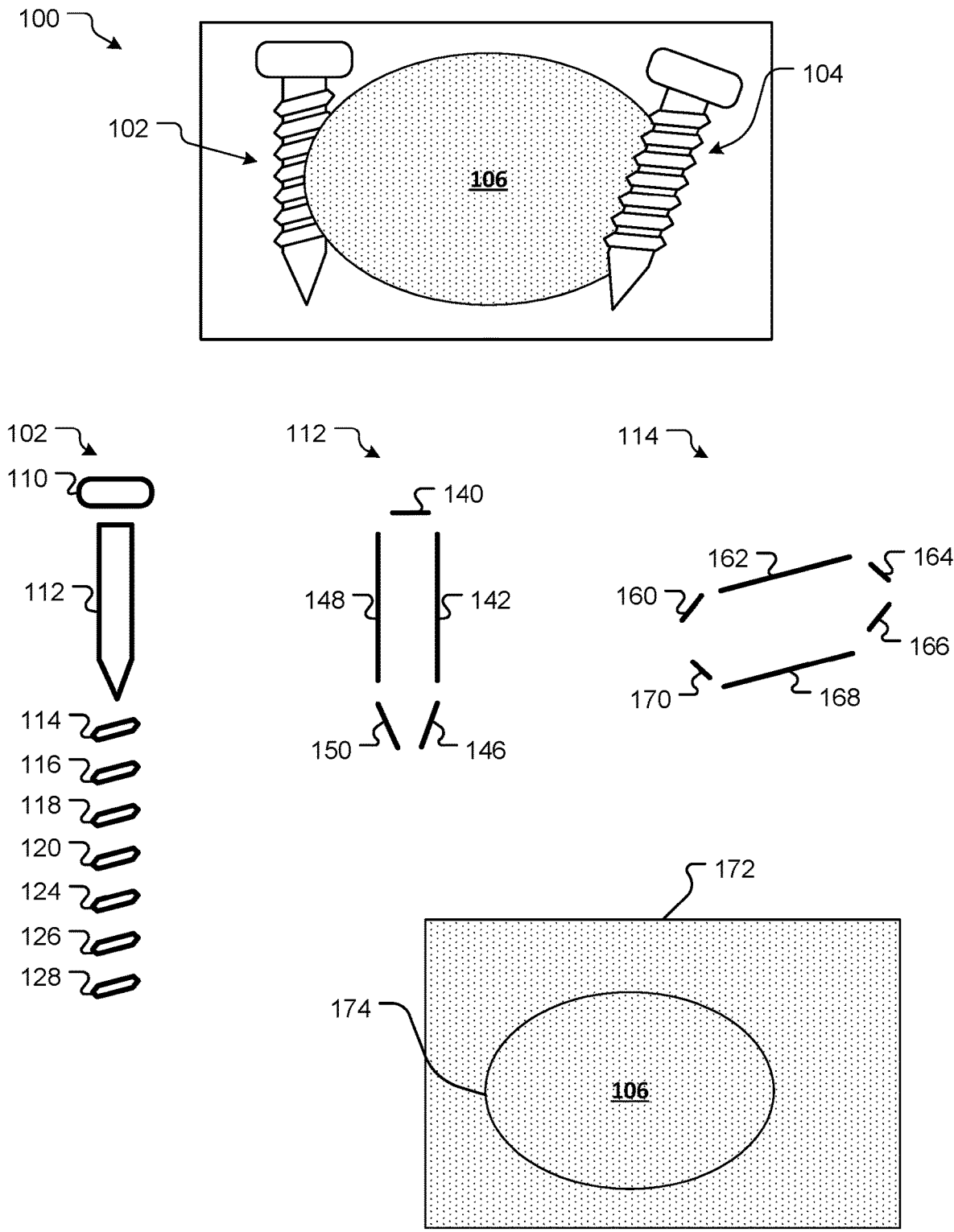
FIG. 1 depicts an example page with vector and raster graphics.

Consider, for example, the partial PDF page 100 of FIG. 1. Page 100 depicts two vector graphic screws 102 and 104 and a raster graphic 106.

Although each screw 102 and 104 of page 100 is perceived as a single object, each is the result of multiple components. In this example, screw 102 is composed of: a head 110, a shaft 112, and seven threads 114-128. These components may be expressed in various ways. For example, and with reference to the PDF: the head 110 may be defined by a path defining four straight lines (top, bottom, left, and right) and four curves (joining the straight lines); the shaft 112 may be defined by a path having five straight lines; and each thread 114-128 may be defined by a path having six straight lines 160, 162, 164, 166, 168, and 170.

In contrast, the SVG format, for example, provides drawing operations that are not available in the PDF. For example, and with reference to the SVG format, the head 110 may be defined by a "rect" drawing operation defining a rectangle with rounded corners. The shaft 112 could be defined by a single "polygon" drawing operation, or could be defined by five distinct "line" drawing operations 140, 142, 144, 146, 148, and 150. Similarly, each thread 114-128 could be defined by a single "polygon" drawing operation or each thread 114-128 could be defined by six distinct "line" drawing operations 160, 162, 164, 166, 168, and 170. Screw 104 may be similarly composed.

Raster graphic 106 is composed of raster data 172: data in respect of a source image or the like and is in a raster format which, for the purposes of the present disclosure, cannot be meaningfully decomposed into component elements. In this example, the raster graphic 106 is associated with a clipping path 174. The clipping path 174 is a vector path which determines the portion of the raster data 172 that is to be displayed—in this example the elliptical portion 106.

When importing composite image (e.g. PDF) data into a document for editing the composite image data is converted into a format appropriate for the editable document. On one approach, a conversion process may result in each individual drawing operation becoming separate element in the editable document. Such an import would, for example, result in 96 separate elements for the two screws, one for each drawing operation.

While such a conversion provides a user with a large amount of editing flexibility it may also prove inefficient and frustrating. For example if a use wishes to edit the imported version of screw 102 in the editable document (e.g. to resize, move, copy, or perform other operations) the user must select all 48 elements that correspond to the components of that screw.

Aspects of the present disclosure are generally directed to improved (or at least useful alternative) systems and methods for converting composite image data into an editable document.

The present disclosure describes the conversion process with PDF data being the original (composite image) data that is converted. The features and techniques described herein can, however, be used (or be adapted to be used) for other composite image data formats which make use of both vector and raster format images/graphics.

The editable document format may be any appropriate editable document, for example a design document (rendered and edited by a design application).

Initially, an example editable document format is provided. An example environment and a computer processing system which can be configured to perform the features described herein are then described. Various operations for converting composite image data are then described.

Various editable document formats are possible, and these will vary depending on the type of document in question. An example editable document format that is used throughout this disclosure will now be described. Alternative editable document formats are, however, possible, and the processing described herein can be adapted for alternative formats.

In the present context, the editable document may be made up of a number of pages. Each page defines an area that is intended to be viewed as a discrete whole. A page will have certain page attributes, for example a page identifier, a page width, and a page height.

A page has an associated coordinate system (typically a common coordinate system provided by the design tool for all pages). In the present disclosure, the editable document page coordinate system is a Cartesian coordinate system defining a horizontal (x) axis (with values increasing from left to right) and vertical (y) axis (with values increasing from top to bottom). It is noted, however, that in the PDF coordinate system y coordinates increase from bottom to top.

A page (e.g. the page identifier) is associated with a list (or array, tree, or other data structure) of document elements.

In the present example, page (and element data) is stored in a device independent document descriptor. By way of example, a document descriptor may be stored in a JSON format file such as the following:

```
{
    "design": {
        "id": "ab120223",
        "creationDate": "1-jun-2020"
        "dimensions": {
            "width": 1080,
            "height": 1080
        },
        "elements": [
            {...},
            {...},
            ...
            {...}
        ],
    }
}
```

In this example, the design descriptor includes design metadata (e.g. a design identifier, a design creation date, and page dimensions (a height and a width) and an array of element descriptors in respect of elements that have been added to the page (described below).

Document elements (elements for short) are objects that are added to a page. Elements may imported (for example from PDF documents/data). Elements can also be drawn or created using one or more design tools (e.g. text/line/rectangle/ellipse/curve/freehand and/or other design tools).

An element that has been added to a page (and added to the page's element list) may be identified in various ways. For example, an element may be identified by its position (index) in the element list. Alternatively (or in addition) an element may be assigned an element identifier that is unique at least within the page that the element has been added to.

A given element has associated element attributes. The particular element attributes that are or can be associated with a given element may depend on the type of element in question. By way of example, however, element attributes may include one or more of those shown in the table below:

| Element attribute | Description |
| --- | --- |
| Identifier | Identifier for the element (unique at least within the page the element has been added to).<br>Alternatively, the position (index) of the element within an element list may be used to identify an element. |
| Type | Identifier of a type of the element. For example, a text element, a vector graphic element, a raster graphic element, a video element, an element group, an alternative type of element. |
| Top | The y coordinate of the element's origin (e.g. y coordinate of the top left corner). |
| Left | The x coordinate of the element's origin (e.g. x coordinate of the top left corner). |
| Width | A value defining the width of the element. |
| Height | A value defining the height of the element. |
| Rotation | A value defining a degree of rotation of the element, e.g. a value x such that −180 degrees <= x <= +180 degrees. |
| Opacity | Data defining any transparency applied to the element. For example a value x such that 0 <= x <= 1, where 0 = fully transparent and 1 = fully opaque. |
| Data | Data defining any content of the element. |
| Children | Data in respect of child elements (where the element is a group). For example an array of element objects. |

Additional (and/or alternative) element attributes are possible.

Element attributes for a given element may be stored in an element descriptor (which is included in the page's element list). For example:

```
{
   "design": {
      ...
   },
   "elements": [
      {
         "type": "vectorGraphic"
         "top": 100,
         "left": 100,
         "width": 500,
         "height": 400,
         "rotation": 0,
         "opacity": 1,
         "Data": {...}
      }
   ],
}
```

Design elements may be grouped together. In the example above, a design group is defined by a 'GROUP' type element and includes a 'children' array, each element of which defines a child element of the group. Element Groups can, however, be alternatively defined, for example by use of a group identifier field (e.g. an element metadata item that identifies a particular group a given element is a member of).

Design elements are also associated with an element depth (or z-index). Where design elements overlap one another the depth of the elements determines which element overlays the other. In the present editable document format element depth/z-index is determined based on an element's position in a page's element array (or an element's children element array where this is relevant). Specifically, an element at index n in the element array is behind an element at index n+1 and in front of an element at index n−1. Where a given element is in front of one or more other elements it can, depending on position/size/rotation/transparency, occlude or partially occlude any/all elements it is in front of. I.e. an element at index n is in front of all elements with an index of <n.

In alternative embodiments element depth/z-index may be an explicitly stored design element attribute.

Figure 2:
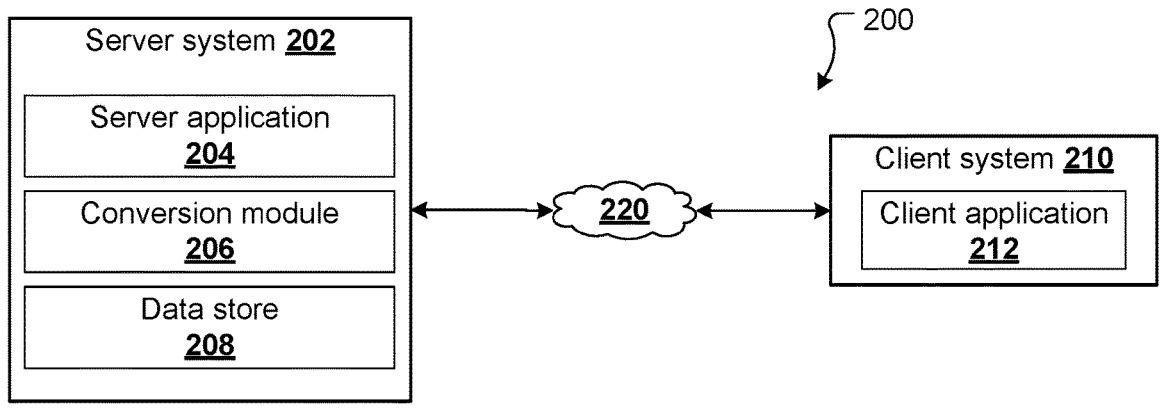
FIG. 2 is a block diagram illustrating an example environment in which features of the present disclosure can be implemented.

FIG. 2 depicts one example of a networked environment 200 in which the various operations and techniques described herein can be performed.

Networked environment 200 includes a server system 202 and a client system 210 that are interconnected via one or more communications networks 220 (e.g. the Internet). While a single client system 210 is illustrated and described, server system 202 will typically serve multiple client systems 210.

The server system 202 includes various functional components which operate together to provide server side functionality.

One component of server system 202 is a front-end server application 204. The server application 204 is executed by a computer processing system to configure the server system 202 to provide server-side functionality to one or more corresponding client applications (e.g. client application 212 described below). The server-side functionality includes operations such as user account management (where required), login (where required), and receiving responding to client requests (e.g. API requests, remote procedure calls, etc.). In the present example the server system 202 provides services/functions related to editable documents (e.g. designs) and as such will typically provide (alone or in conjunction with client application 212) functions such as document creation, document editing, document saving, document sharing/publication, and/or other relevant functions.

To provide the server-side functionality, the server application 204 comprises one or more application programs, libraries, APIs or other software elements. For example, where the client application 212 is a web browser, the server application 204 will be a web server such as Apache, IIS, nginx, GWS, or an alternative web server. Where the client application 212 is a native application, the server application 204 may be an application server configured specifically to interact with that client application 212. Server system 202 may be provided with both web server and application server.

In the present example, server system 202 also includes a conversion module 206 which is described further below.

Server system 202 also includes a data store 208 which is used to store various data required by the server system 202 in the course of its operations. Such data may include, for example, user account data, document template data, data in respect of documents that have been created by users, and/or other data. While one data store 206 is depicted server system 202 may include/make use of multiple separate data stores—e.g. a user data store (storing user account details), one or more element library data stores (storing elements that users can add to documents being created); a template data store (storing templates that users can use to create documents); a documents data store (storing data in respect of documents that have been created); and/or other data stores.

In order to provide server side functionality to clients, server system 202 will typically include additional functional components to those illustrated and described. As one example, server system 202 will typically include one or more firewalls (and/or other network security components) and load balancers (for managing access to the server application 204).

The server system 202 components have been described as functional components, and may be implemented by hardware, software (data and computer readable instructions which are stored in memory and executed by one or more computer processing systems), and/or a combination of hardware and software.

The precise hardware architecture of server system 202 will vary depending on implementation, however may well include multiple computer processing systems (e.g. server computers) which communicate with one another either directly or via one or more networks, e.g. one or more LANS, WANs, or other networks (with a secure logical overlay, such as a VPN, if required).

For example, a single server application 204 may run on a single, dedicated server computer and data store 206 may run on a separate server computer (with access to appropriate data storage resources). As an alternative example, server system 202 may be configured to provide multiple server applications 204 which are executed on appropriate hardware resources and commissioned/decommissioned based on user demand 204. In this case there may be multiple server computers (nodes) running multiple server applications 204 which service clients via a load balancer.

Client system 210 hosts a client application 212 which, when executed by the client system 210, configures the client system 210 to provide client-side functionality for server application 204 of the server system 202. Via the client application 212, a user can interact with the server application 204 in order to perform various operations such as creating, editing, saving, retrieving/accessing, publishing, and sharing documents.

Client application 212 may be a web browser application (such as Chrome, Safari, Internet Explorer, Opera, or an alternative web browser application) which accesses the server application 204 via an appropriate uniform resource locator (URL) and communicates with server application 204 via general world-wide-web protocols (e.g. http, https, ftp). Alternatively, the client application 212 may be a native application programmed to communicate with server application 204 using defined application programming interface (API) calls.

Client system 210 may be any computer processing system which is configured (or configurable) by hardware and/or software to offer client-side functionality. By way of example, client system 210 may be a desktop computer, a laptop computer, a netbook computer, a tablet computing device, a mobile/smart phone device, a personal digital assistant, or an alternative computer processing system.

Although not illustrated in FIG. 2, client system 210 will typically have additional applications installed thereon, for example, at least an operating system application such as a Microsoft Windows operating system, an Apple macOS operating system, an Apple iOS operating system, an Android operating system, a Unix or Linux operating system, or an alternative operating system.

In example environment 200 server system 202 includes a conversion module 206. The conversion module 206 is a software module that includes instructions and data for performing various import operations described herein.

While the conversion module 206 has been depicted and described as distinct to the server application 204, the functionality provided by the conversion module 206 could be natively provided by the server application 204 (i.e. by sever application 204 itself including relevant instructions and data to perform the processing that is described as being performed by the conversion module 206).

In alternative implementations, the conversion module 206 could be provided at the client system 210—e.g. as a stand-alone application in communication with the client application 212, a plug-in/add-on/extension to client application 212, or an integral part of client application 212.

In further implementations, the functions provided by the conversion module 206 could be provided as an entirely separate service—e.g. running on a separate server system to server system 202 and communicating with client application 212 (and/or server system 202) as required to perform various processing described herein.

In still further implementations, the functionality described as being performed by the conversion module 206 could be distributed between multiple systems (e.g. client system 210 and server system 202).

The features and techniques described herein are implemented using one or more computer processing systems.

For example, in networked environment 200 described above, client system 210 is a computer processing system (for example a personal computer, tablet/phone device, or other computer processing system). Similarly, the various functional components of server system 202 are implemented using one or more computer processing systems (e.g. server computers or other computer processing systems).

Figure 3:
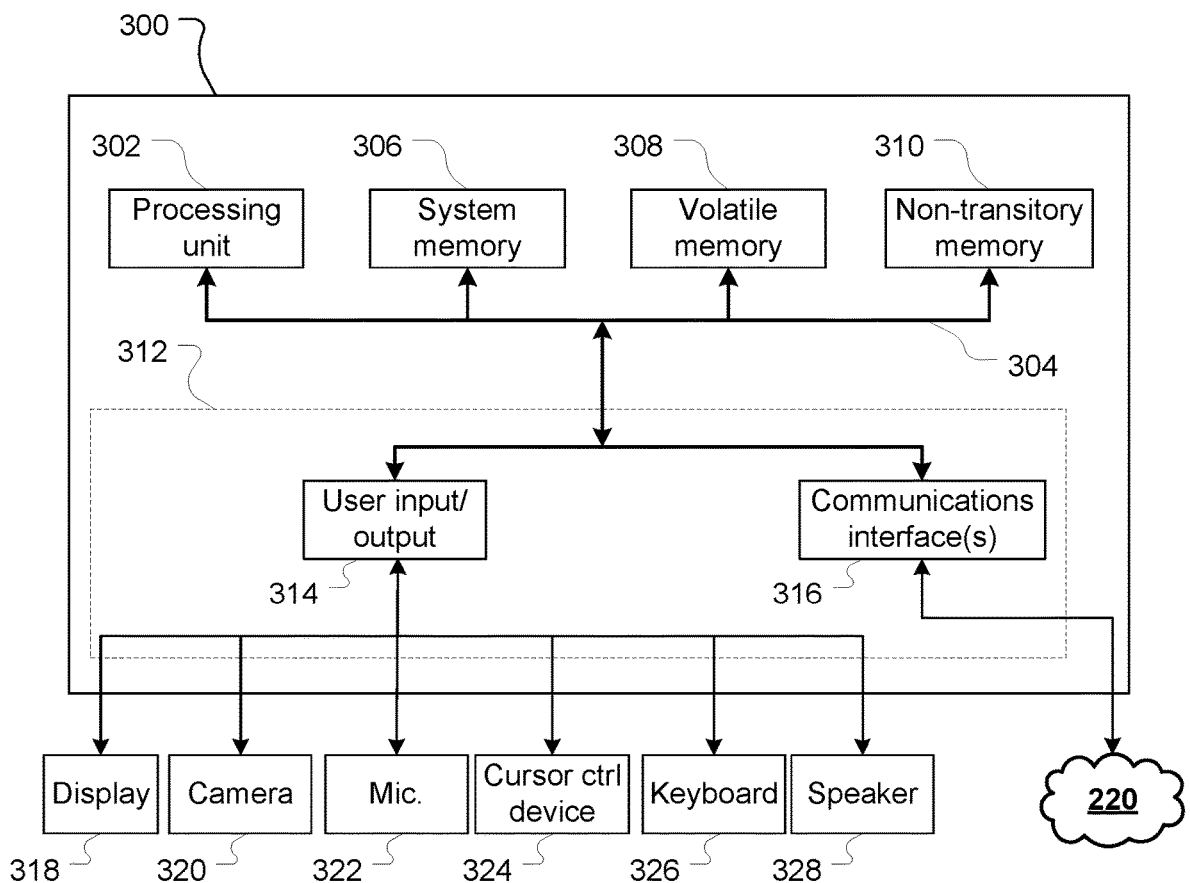
FIG. 3 is an example computer processing system configurable to perform various features described herein.

FIG. 3 provides a block diagram of a computer processing system 300 configurable to implement embodiments and/or features described herein. System 300 is a general purpose computer processing system. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302. The processing unit 302 may be a single computer processing device (e.g. a central processing unit, graphics processing unit, or other computational device), or may include a plurality of computer processing devices. In some instances, where a computer processing system 300 is described as performing an operation or function, all processing required to perform that operation or function will be performed by processing unit 302. In other instances, processing required to perform that operation or function may also be performed by remote processing devices accessible to and useable by (either in a shared or dedicated manner) system 300.

Through a communications bus 304, the processing unit 302 is in data communication with a one or more machine readable storage (memory) devices which store instructions and/or data for controlling operation of the processing system 300. In this example, system 300 includes a system memory 306 (e.g. a BIOS), volatile memory 308 (e.g. random access memory such as one or more DRAM modules), and non-volatile memory 310 (e.g. one or more hard disk or solid state drives).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g. networked) connection.

Wired connection with other devices/networks may be by any appropriate standard or proprietary hardware and connectivity protocols. For example, system 300 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 300 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 300 connects—whether by wired or wireless means—include one or more input devices to allow data to be input into/received by system 300 for processing by the processing unit 302, and one or more output device to allow data to be output by system 300. Example devices are described below, however it will be appreciated that not all computer processing systems will include all mentioned devices, and that additional and alternative devices to those mentioned may well be used.

For example, system 300 may include or connect to one or more input devices by which information/data is input into (received by) system 300. Such input devices may include keyboards, mice, trackpads, microphones, accelerometers, proximity sensors, GPS devices and the like. System 300 may also include or connect to one or more output devices controlled by system 300 to output information. Such output devices may include devices such as display devices, speakers, vibration modules, LEDs/other lights, and such like. System 300 may also include or connect to devices which may act as both input and output devices, for example memory devices (hard drives, solid state drives, disk drives, compact flash cards, SD cards and the like) which system 300 can read data from and/or write data to, and touch screen displays which can both display (output) data and receive touch signals (input).

By way of example, where system 300 is an end user device (such as a desktop computer, laptop computer, smart phone device, tablet device, or other device) it may include a display 318 (which may be a touch screen display), a camera device 320, a microphone device 322 (which may be integrated with the camera device), a cursor control device 324 (e.g. a mouse, trackpad, or other cursor control device), a keyboard 326, and a speaker device 328.

System 300 also includes one or more communications interfaces 316 for communication with a network, such as network 220 of environment 200 (and/or a local network within the server system 202 or OS). Via the communications interface(s) 316, system 300 can communicate data to and receive data from networked devices, which may themselves be other computer processing systems.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (or software of modules)—i.e. computer readable instructions and data which, when executed by the processing unit 302, configure system 300 to receive, process, and output data. Instructions and data can be stored on non-transitory machine readable medium accessible to system 300. For example, instructions and data may be stored on non-transitory memory 310. Instructions and data may be transmitted to/received by system 300 via a data signal in a transmission channel enabled (for example) by a wired or wireless network connection over interface such as 312.

Applications accessible to system 300 will typically include an operating system application. System 300 also stores or has access to applications which, when executed by the processing unit 302, configure system 300 to perform various computer-implemented processing operations described herein. For example, and referring to the networked environment of FIG. 2 above: client system 210 includes a client application 212 which configures the client system 210 to perform the operations described herein.

In some cases, part or all of a given computer-implemented method will be performed by system 300 itself, while in other cases processing may be performed by other devices in data communication with system 300.

Figure 4:
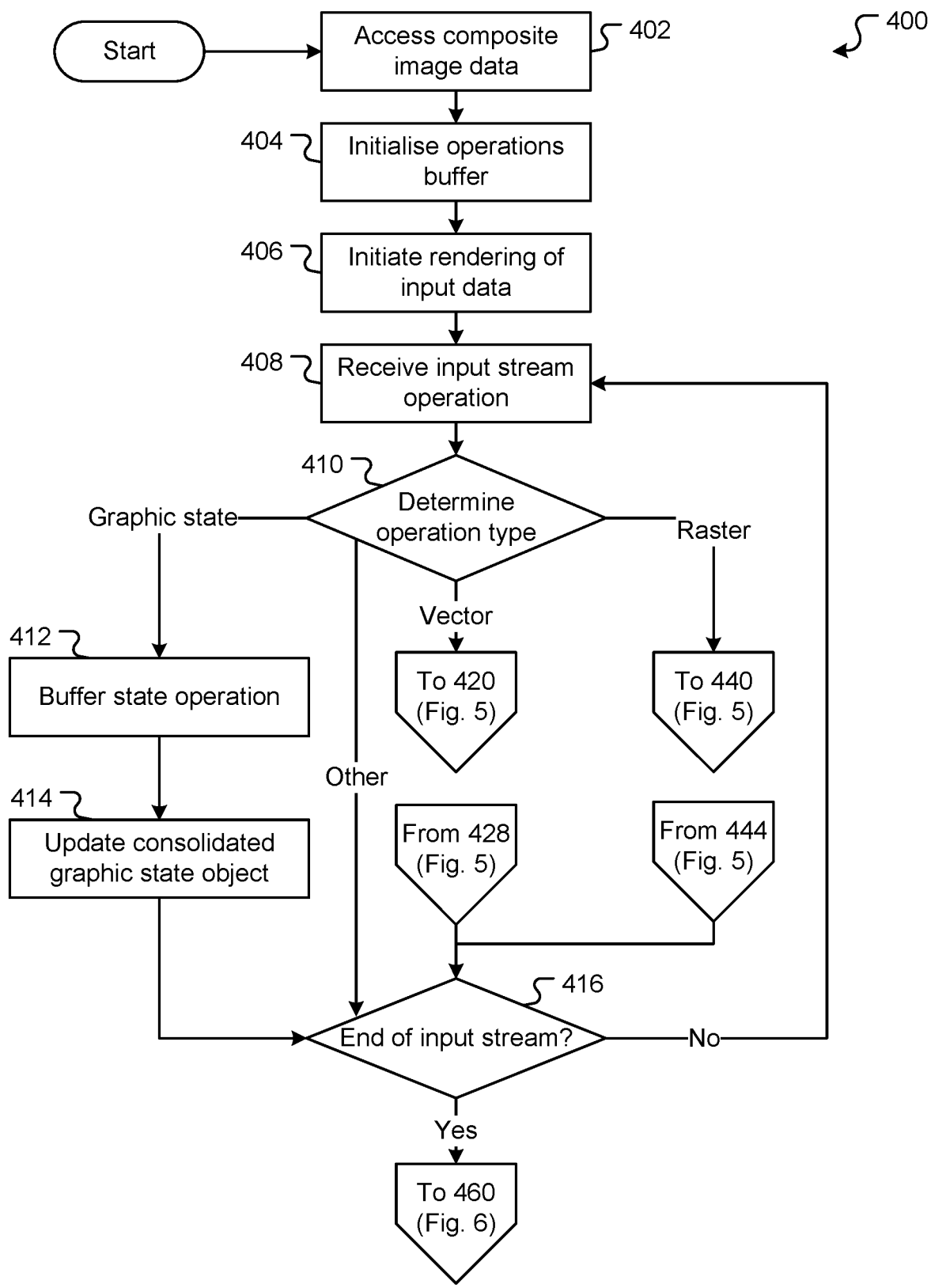
FIGS. 4 to 6 provide a flowchart depicting operations involved in processing composite image data to generate a set of editable document page elements.
Figure 5:
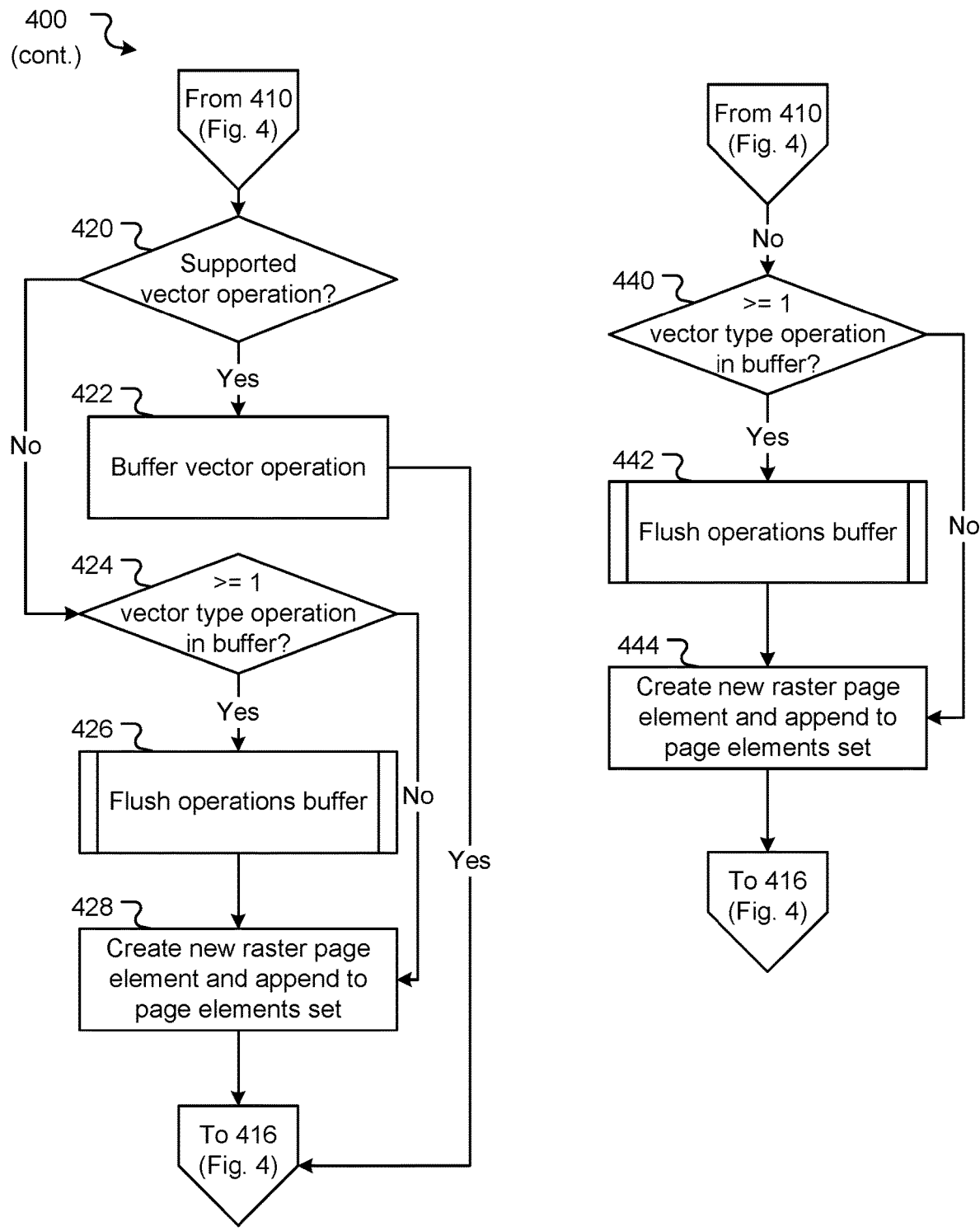
Figure 6:
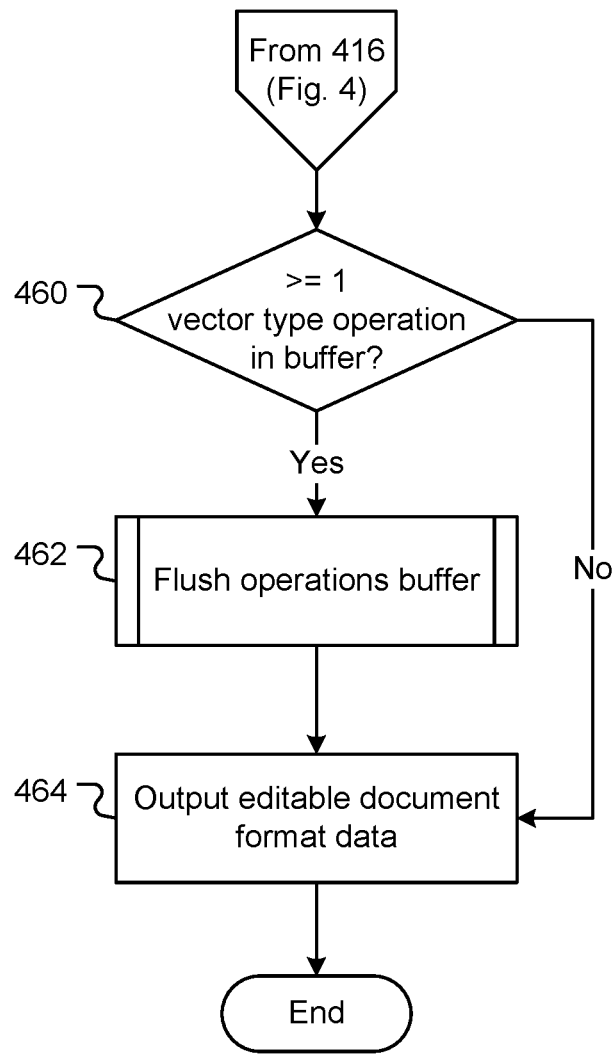

Turning to FIGS. 4 to 6, a conversion process 400 for converting composite image data (in this example PDF data) into a set of editable document page elements will be described.

Processing is described as being performed by the conversion module 206, however processing could be performed by an alternative module, application, or group of modules/applications.

Over the course of the processing described below the conversion module 206 generates various data. In order to illustrate this data tables are used. It will be appreciated, however, that conversion module 206 may be configured to generate and store the data in any appropriate format—e.g. using one or more arrays, lists, objects/dictionaries, and/or other data types.

At 402, the conversion module 206 accesses composite image data. In the present example the composite image data is PDF data. Conversion module 206 may access the composite image data in response to a user of client application 212 importing an original document (e.g. a PDF document or PDF page) or otherwise selecting data from an original document (e.g. by copying a selection of data from a PDF document and pasting it into an editable document managed by the client application 212).

At 404, the conversion module 206 initialises data structures that will be used over the course of process 400. In this example, an operations buffer and a page element set are initialised.

In the present example, the operations buffer is an array, though an alternative data structure could be used (provided the data structure allows order to be maintained as operations are added/removed from the buffer). The operations buffer is initially empty and populated over the course of process 400. In the present example, and as discussed below, a buffered operation may be a graphic state update type operation (also referred to as a state type operation for short) or a vector type operation. These types are discussed further below (with reference to operation 410).

By way of example, however, a populated operations buffer may be as follows:

```
[
    GraphicsContext.setPaint(Paint paint) {
        operations.add(new SetPaint(paint))
    },
    GraphicsContext.setTransform(AffineTransform tx) {
        operations.add(new SetTransform(tx))
    },
    Graphics.draw(Shape s) {
        operations.add(new DrawShape(s))
    },
    ...
]
```

This example includes two state type operations (defining, respectively, a setPaint operation and a setTransform operation) and one vector type operation (defining a drawShape operation).

Alternative data structures may be used for the operations buffer.

The page elements set is a set of editable document page elements that is populated over the course of process 400. As per the example above, the set of page elements may be an array (or other set) of page elements, each page element taking a format such as:

```
{
    "type": "<element type>",
    "top": <top coordinate of element in document space>,
    "left": <left coordinate of element in document space>,
    "width": <width of element>,
    "height": <height of element >,
    "rotation": <rotation of element>,
    "opacity": <value indicating opacity>,
    "data": {<element data - e.g. SVG data, raster data>}
}
```

Alternative page element formats (storing alternative page element data) are possible.

At 406, the conversion module 206 initiates rendering of the composite image data to a virtual canvas. Virtual, in this sense, is used to indicate that the rendering does not need to produce a visible result. This generates an ordered stream of input operations (referred to as the input stream) which are processed by the conversion module 206 in turn. The operations in the input stream are in depth or z-order, from background to foreground.

Generating the stream of input operations may be achieved in various ways. In the present example, the stream of input operations is generated by calling the 'renderPageToGraphics' function of the PdfBox library.

Generally speaking, the stream of input operations may include graphic state update type operations (state operations for short), vector type operations, raster type operations, or other operations.

A state type operation is an operation that concerns the graphic state defined by the input composite image data. In the PDF format, state operations are (generally) cumulative in the sense that each state operation provides a delta to the existing graphic state. For example, state type operations generated by PdfBox include non-stroking colour operations (e.g. the 'sc' operation which is used to change the non-stroking colour), stroking colour operations (e.g. the 'SC' operation which is used to change the stroking colour), and state operations (e.g. the 'Tm' operator which is used to change the transformation matrix). In addition, the PDF provides a mechanism to define identifiers for graphic states and to set graphic state parameters by referring to a graphic state identifier (using the '/gs' operator).

A vector type operation is data that can potentially be used to generate an editable document vector page element (though may not ultimately be). Generally speaking, a vector type operation is an operation that defines a graphic by one or more sets of coordinates and a mathematical formula or rules for creating a graphic based on the set(s) of coordinates. By way of example, PdfBox maps PDF vector type operations to Graphics2D operations (such as 'CurveTo').

A raster type operation is an operation that will be used to generate an editable document raster page element. By way of example, a raster type operation generated by PdfBox may be a 'Do' (draw object) operation in respect of a raster image.

Other operations are operations that are not required for process 400. In the present example, text operations are not processed. More generally, text operations may be handled in various ways (either by adapting process 400 to do so or handling in a separate process). One way of handling text operations is described in Australian patent application 2021201352, titled "Systems and methods for extracting text from portable document format data", filed on 2 Mar. 2021, the contents of which are incorporated herein by reference. By way of alternative, all text operations encountered may be written to a separate text buffer which is then processed once the end of the input stream has been reached).

At 408, the conversion module 206 receives the next operation in the input stream.

At 410, the conversion module 206 determines the type of the input stream operation received at 408: where the input stream operation is a state type operation processing proceeds to 412; where the input stream operation is a vector type operation processing proceeds to 420, FIG. 5; where the input stream operation is a raster type operation processing proceeds to 440, FIG. 5; and where the input stream operation is an alternative (other) operation the operation is discarded and processing proceeds to 416.

A state operation defines graphic state data. The graphic state data applies to other drawing/rendering operations that are defined by the input stream and may include state data such as a transformation matrix, a clipping path, a colour, an alpha constant, and/or other parameters.

In the present example (where the composite image data is in the PDF format), state operations are cumulative in the sense that each state operation includes data (a delta) that is applied to the current graphic state (the current graphic state being defined by one or more previous state operations).

At 412, the conversion module 206 buffers the state operation in the operations buffer. In the present implementation the order of the operations in the operations buffer is important and matches that of the input stream (i.e. background to foreground). Accordingly, the new state operation is written to the end of the operations buffer—e.g. via an append operation.

In the present embodiment, the conversion module 206 also maintains a consolidated graphic state object which provides a current snapshot of the graphic state at the current point of the input stream: i.e. the values of all graphic state parameters that are defined at the current point in the input stream. Accordingly, at 414 the conversion module 206 updates the consolidated graphic state object to take into the current state operation.

Providing/maintaining a consolidated graphic state object provides for processing efficiencies in some cases. It will be appreciated, however, that the graphic state at the current point in the input stream could instead be calculated/built up by processing each state operation in turn.

Once the state operation has been processed, processing continues to 416.

At 416, the conversion module 206 determines if the input stream initiated at 406 is complete. If so, processing proceeds to 460 (FIG. 6). If not, processing returns to 408 to receive and process the next input stream operation.

At 420 (FIG. 5), the input stream operation is a vector type operation (as determined at 410).

Where the input stream operation is a vector type operation, the conversion module 206 initially determines if the input stream operation is a supported vector type operation.

The conversion module 206 may determine that a particular vector type operation is supported (or not supported) based, for example, on the current graphic state (i.e. the graphic state associated with the vector type operation). Where the conversion module 206 maintains a consolidated graphic state object (e.g. as described above with reference to 414), the current graphic state is determined by reference to this object. If a consolidated graphic state object is not maintained, the current graphic state can be determined by reference to all state operations stored in the operations buffer.

Whether or not an input vector type operation is supported is determined by reference to what vector drawing operations are supported by the editing application in question (i.e. the editing application provided via client application 210 and server application 204). By way of example, the editing application may not provide vector graphic support for all graphic state parameters that are supported by the composite image data format. As a specific example, a texture paint or gradient shading operation defined in PDF data may not be vector graphic operations that are supported by the editing application. In this case, a drawing operation that includes (due to the state parameters) either a texture paint or gradient shading cannot be converted to a vector graphic for the editing application and must instead be converted into a raster graphic.

In alternative implementations, the conversion module 206 may be configured to convert an unsupported drawing operation into a supported drawing operation. For example, the conversion module 206 may convert an unsupported gradient shading operation into a supported solid fill operation (the colour of the fill being taken from the gradient defined by the PDF data).

If, at 420, the conversion module 206 determines that the input vector type operation is supported, processing proceeds to 422. Otherwise, processing proceeds to At 422 the conversion module 206 buffers the vector type operation by writing it to the operations buffer (e.g. by appending it to the end of the operations buffer). Processing then proceeds to 416 (FIG. 4).

At 424, the vector type operation is not supported. In this case, the conversion module 206 determines if the operations buffer contains any vector type operations. If so, processing continues to 426. Otherwise processing proceeds to 428.

At 426, the conversion module 206 flushes the operations buffer. This process is described below with reference to FIGS. 7 and 8 and generally involves generating one or more editable document page elements from the buffered operation(s), saving those page elements to the page element set, and clearing all vector type operations from the operations buffer. Processing then proceeds to 428.

At 428, the conversion module 206 creates a new raster page element based on the input stream vector type operation and the current graphic state (either as defined in a consolidated graphic state object or reconstructed from the state operations in the operations buffer). The new page element is then added to the set of page elements. As the order of the page element set is important the new page element is added to the end of the page element set (e.g. by appending).

In the context of the example page element format described above: position data for the new raster page element (e.g. the "top", "left", "width", "height" values) are taken from (or calculated based on) the input stream operation data as well as any relevant graphic state data (for example any transformation data).

The actual raster data for the new raster page element is generated by converting the input stream vector type operation (taking into account any relevant state parameters) into a raster format (e.g. the .png format). By way of example, the conversion module 206 may create a "BufferedImage" with the required dimensions (scaled up to a high DPI such that the resulting raster will look sharp when printed or zoomed), and then apply the recorded graphics operations on a Graphics2D that is created from the BufferedImage.

Processing then proceeds to 416 (FIG. 4) to determine if the end of the input stream has been reached.

At 440 (FIG. 5), the input stream operation is a raster type operation (as determined at 410).

Where the input stream operation is a raster type operation processing is similar to the processing performed where an unsupported vector type operation is encountered. At 440, the conversion module 206 determines if the operations buffer has any vector type operations stored therein. If so, processing continues to 442. Otherwise processing proceeds to 444.

At 442, the conversion module 206 flushes the operations buffer (described below with reference to FIGS. 7 and 8). Processing then proceeds to 444.

At 444, the conversion module 206 creates a new raster page element corresponding to the input stream operation and the current graphic state (either as defined in a consolidated graphic state object or reconstructed from the state operations in the operations buffer). The new raster page element is then added (e.g. appended) to the page element set.

In the example editable document format described above, a "Shape" type element is created for the raster image and the raster data itself is stored in the 'data' field of that Shape element.

If the current graphic state defines a clipping path, that clipping path is set as the path of the Shape type element. If not, the path of the shape type element is set based on the shape of the raster image itself.

Where a clipping path is defined, creating a shape element in this manner allows the raster page element to be easily manipulated in the editing application, for example in order to adjust the visible area of the raster within the shape or by replacing the original raster within the shape with an entirely new one.

In the context of the example page element format described above: position data for the new raster page element (e.g. the "top", "left", "width", "height" values) are taken from (or calculated based on) the input stream operation data as well as any relevant graphic state data (for example any transformation data). Rotation and opacity for the raster page element are based on applicable parameters of the current graphic state.

The actual raster data for the new raster page element is the raster data associated with the input stream operation. If the raster data from the stream is not a raster format supported by the editing application, the conversion module 206 converts to a suitable raster format (e.g. .png, .bmp, or an alternative format supported by the editing application). This conversion may be performed by use of library functions such as those provided by the ImageIO library.

Processing then proceeds to 416 (FIG. 4) to determine if the end of the input stream has been reached.

At 460 (FIG. 6), the end of the input stream has been reached (as determined at 414). In this case the conversion module 206 determines if the operations buffer contains any vector type operations. If so, processing continues to 462. Otherwise processing proceeds to 464.

At 462, the conversion module 206 flushes the operations buffer (described below with reference to FIGS. 7 and 8). Processing then proceeds to 464.

At 464, the conversion module 206 outputs editable document format data—e.g. the page element set that has been created. Where text operations defined in the input data are separately processed, any text page elements that are created by that processing are included in the page element set—e.g. by appending them to the end of the page element set (on the assumption that text in a design is intended to be visible/unobscured by other elements and, therefore, should be in the foreground) or interleaving them within the existing elements (where depth order is to strictly maintained). The page element set may be output to a display (such as display 318), e.g. rendered by an editing application such as client application 212 for a user to view and interact with. In addition, or alternatively, the page element list may be saved to memory (e.g. in a file system or database) as an editable document format document.

As described above, the conversion module 206 is configured to flush the operations buffer when an unsupported vector type operation is encountered (at 426), when a raster type operation is encountered (at 442), and once the end of the input stream has been reached (at 462). The conversion module 206 could, however, be configured to flush the operations buffer on additional and/or alternative trigger events.

Figure 7:
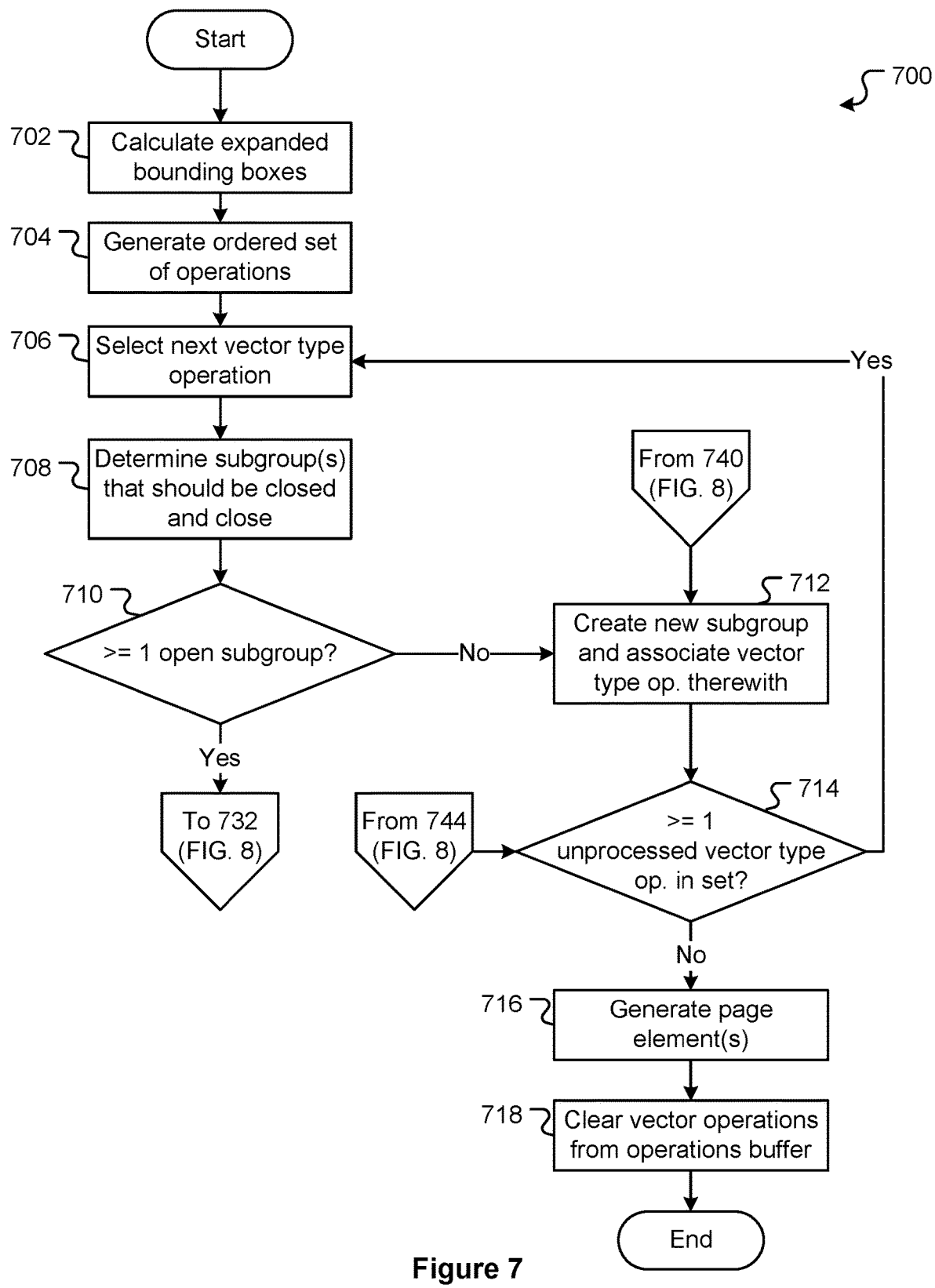
FIGS. 7 and 8 provide a flowchart depicting operations involved in processing a set of operations to generate one of more editable document page elements.
Figure 8:
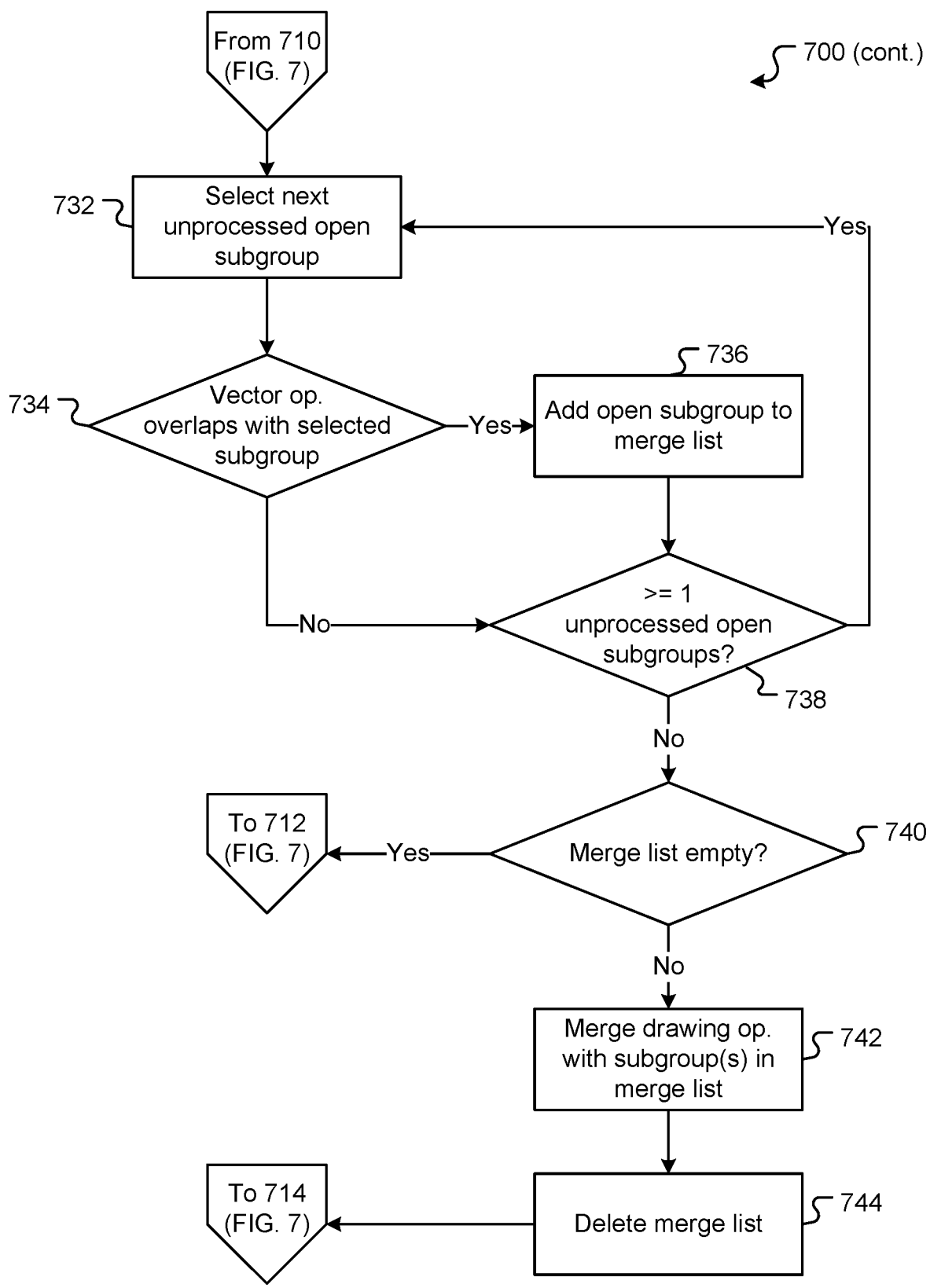

Turning to FIGS. 7 and 8, a page element generation process 700 will be described. Process 700 takes as input a set of operations and generates one or more editable document page elements therefrom.

In the present example, the set of operations is the operations buffer generated by process 400, and process 700 is invoked each time the operations buffer needs to be flushed—e.g. at 426 and 442, and 462. Process 700 could, however, be used with a set of operations generated by an alternative process.

Over the course of process 700 the conversion module 206 generates one or more vector type operation subgroups (referred to as subgroups for short). In the present example each group is associated with the following data:

| Field | Value |
|---|---|
| Subgroup identifier | An identifier for the vector type operation subgroup. Any appropriate identifier may be used - e.g. 001, 002, 003. |
| Vector type operation members | An array/other list of vector type operations that have been assigned to/associated with the subgroup. |
| Subgroup bounding box | Data defining (or allowing calculation of) (min x, max x, min y, max y) coordinates of the subgroup. While described as being stored, bounding box data can be calculated based on the vector type operation members. |

-continued

| Field | Value |
|---|---|
| Subgroup state | A flag/variable that indicates a state of the subgroup, in this case whether the subgroup is open or closed (used in processing as described below). |

Process 700 is described with reference to a processing direction which impacts various operations performed over the course of the process. In the examples described below the processing direction from min x to max x (which, in the document space coordinate system of the present example, is left to right). Process 700 can be adapted, however, for other area processing directions, for example max x to min x, min y to max y, max y to min y.

Generally speaking, process 700 operates to associate each vector type operation from the set of operations to a subgroup. To do so, conversion module 206 determines one or more subgroups of collectively overlapping vector type operations. Collectively overlapping vector type operations are vector type operations that, as a group, have overlapping expanded bounding boxes. For example, if a first vector type operation overlaps a second vector type operation and the second vector type operation overlaps a third vector type operation, then the first second and third vector type operations are collectively overlapping (even if the first vector type operation does not itself overlap the third vector type operation) and therefore will be associated with a particular subgroup. A fourth vector type operation that does not overlap any of the first, second, or third vector type operations (or any other vector type operations that overlap the first, second, or third vector type operation) will be part of separate subgroup (and, ultimately, will be associated with a separate page element).

At 702, the conversion module 206 calculates expanded bounding boxes for each vector type operation in the set of operations (e.g. in the operations buffer).

A bounding box defines (or includes data that can be used to calculate) a set of four coordinates: (min x, max x, min y, max y). These coordinates may be explicitly defined. Alternatively, the bounding box may define data allowing the four coordinates to be calculated. As one example, a bounding box may define a min x coordinate, a width, a min y coordinate, and a height. In this case the max x coordinate is calculated by adding the width to the min x coordinate and the max y coordinate is calculated by adding the height to the min y coordinate. Alternatives are possible.

In order to calculate the bounding box for a given vector type operation, the conversion module 206 first calculates an initial bounding box for the vector type operation. The initial bounding box is calculated based on the vector type operation in question as well as the graphic state associated with that vector type operation (which may, for example, define a transformation matrix and/or other data relevant to the vector type operation, such as the stroke width of a 'draw' operation).

In the example above, the graphic state is cumulatively defined by state operations in the operations buffer. Accordingly, for a given vector type operation at position/index n of the operations buffer, the graphic state that applies to that vector type operation is the graphic state defined by all state operations with a position/index of <n in the operations buffer. The graphic state can be progressively built up by applying the state operations in order.

Following calculation of a vector type operation's initial bounding box, the conversion module 206 calculates an expanded bounding box for that vector type operation. In the present embodiments axis aligned bounding boxes are calculated—i.e. bounding boxes with no (0 degree) rotation.

In this embodiment, the conversion module 206 calculates a vector type operation's expanded bounding box by applying a uniform expansion factor to the vector type operation's document space bounding box. The inventors have identified that an expansion factor of 5 to 10 pixels (or, in the PDF, 5 to 10 units) provides good results. Alternative expansion factors can, however, be used. In calculating a vector type operation's expanded bounding box conversion module 206 expands the originally calculated bounding box evenly on all sides so the original bounding box is centered in the expanded bounding box.

In alternative embodiments, separate horizontal and vertical expansion factors may be used to generate the expanded bounding box. Furthermore, the (or each) expansion factor may be a dynamic expansion factor that is calculated as a percentage of the size (e.g. height and width) of the page being processed.

The precise manner in which expanded bounding boxes for vector type operations are calculated can vary. In one embodiment the conversion module 206 iterates through the operations buffer from start (e.g. index=0) to finish, maintaining a current state object (similar to that described at 414 above). Where a state operation is encountered the current state object is updated. Where a vector type operation is encountered, its expanded bounding box is calculated with reference to the graphic state defined by the current state object.

Following 702, an expanded bounding box (i.e. rectangle) has been calculated for each vector type operation. In addition, given calculation of expanded bounding boxes requires reconstruction of the graphic state for each vector type operation, the conversion module 206 may also store relevant graphic state data that applies to each vector type operation so this does not need to be recalculated downstream.

Finally, the conversion module 206 may also record the depth of each vector type operation as an explicit value (given the re-ordering operation performed at 704 and discussed below).

In certain embodiments, therefore, the data available following 702 for each vector type operation defined in the operations buffer may include the following. The indicated fields may be stored in the original operations buffer or as new records in an alternative data structure:

| Data | Description |
| --- | --- |
| Identifier (and depth) | This may, for example, be the original index/position of the vector type operation in the operations buffer which can be used to both identify the vector type operation and its depth relative to other vector type operations. |
| Vector type operation data | The drawing operation data is taken from the input vector type operation. |
| Expanded bounding box | Data defining (or allowing calculation of) (min x, max x, min y, max y) coordinates of the vector type operation. |
| Graphic state data | Graphic state parameters that are relevant to the vector type operation. |

In this example the initial bounding box coordinates for each vector type operation have not been stored. These values could, however, also be stored for future reference.

At 704, the conversion module 206 generates an ordered set of the vector type operations. The order is defined by the processing direction. In the present example, vector type operations are ordered based on their expanded bounding box coordinates (as calculated at 702). Vector type operations could, however, be ordered based on their initial bounding boxes.

Where the processing direction is min x to max x (e.g. left to right), conversion module 206 orders vector type operations based on expanded bounding box min x coordinates (lowest min x to highest min x). If two or more vector type operations have expanded bounding boxes with the same min x coordinate, those vector type operations can be further ordered in any manner (for example by then considering min y coordinates).

Where process 700 is invoked from process 400 (and the set of operations is the operations buffer) a vector type operation's position in the operations buffer indicates its depth/z-index. This depth information is important. Accordingly, the ordering performed at 708 does not result in the depth of the vector type operations as defined by the operations buffer being lost. In some implementations, to prevent depth information being lost the conversion module 206 may associate explicit depth information with each vector type operation (e.g. as described above).

At 706, the conversion module 206 selects the next unprocessed vector type operation. Vector type operations are selected based on the ordering determined at 704.

At 708, the conversion module 206 determines if any open subgroups should be closed. Where the processing direction is min x to max x, conversion module 206 compares the min x coordinate of the selected vector type operation's expanded bounding box to the max x coordinate of each open subgroup's bounding box. If the vector type operation's expanded bounding box min x is greater than an open subgroup's bounding box max x, conversion module 206 determines that the open subgroup should be closed. Conversion module 206 then closes the subgroup, for example, by setting the state variable for the subgroup to "closed".

At 710, the conversion module 206 determines if there are any open subgroups—i.e. any subgroups with a state value indicating the subgroup is open. At least in the first iteration of process 700 there will be no open subgroups. If there are no open subgroups, processing proceeds to 712.

At 712, the conversion module 206 has either determined that there are no open subgroups (at 710) or that the vector type operation does not overlap with any open subgroups (and, therefore, the merge list is empty, at 740). At 712, the conversion module 206 creates a new open subgroup and associates the selected vector type operation with that new subgroup. In the present example this involves the conversion module 206 generating a new subgroup record such as:

| Field | Value |
| --- | --- |
| Subgroup identifier | New identifier created by the conversion module 206. |
| Vector type operation members | An array/other list to which the identifier of the vector type operation in question is added. |
| Subgroup bounding box | Based on the currently selected vector type operation's expanded bounding box. |
| Subgroup state | Initialized to open (e.g. "open"). |

Following creation of the new subgroup at 712, processing proceeds to 714.

At 714, the conversion module 206 determines if there are any unprocessed vector type operations in the set of operations (e.g. the operations buffer). If so, processing returns to 706 to select the next vector type operation for processing. If not, processing proceeds to 716.

At 716, all vector type operations in the operations buffer have been processed. At this point one or more subgroups have been generated, and every vector type operation defined in the operations buffer has been associated with one of those subgroups.

At 716 the conversion module 206 processes each subgroup to generate a page element based thereon. In the present embodiments, this involves processing each subgroup to determine whether to generate a vector page element or a raster page element corresponding to that subgroup. In the present embodiments, the conversion module 206 makes this determination with reference to the number of raster images in the subgroup (which should be zero), the number of shapes (or vector type operations) in the subgroup, and whether shading is defined or not. If there are no raster images in the subgroup, number of vector type operations is less than a defined vector type operations threshold, and there is no shading the conversion module 206 generates a vector page element corresponding to the subgroup. Otherwise, the conversion module 206 generates a raster page element corresponding to the subgroup (e.g. a similar manner as described above with reference to 428).

Generation of a raster page element instead of a vector page element is done to prevent overly complex vector images being generated (and the processing that would be required to generate such vector images and, in due course, render them). Any appropriate vector type operations threshold may be used, for example 1000 vector type operations. Furthermore, additional criteria may be applied in determining whether to generate a vector page element or raster page element. For example, the complexity of the vector type operations (e.g., the number of elements that describe a path in a single 'fill' operation) may be taken into account, with overly complex operations leading to the generation of a raster page element.

Due to the manner in which the subgroups are generated, the vector type operation(s) of one subgroup do not overlap the vector type operation(s) of any other subgroup. Given this, the depth of one subgroup relative to another is not important, so the subgroups may be processed (and page elements corresponding to each subgroup added to the page element set) in any order. Notably this is only true for subgroups generated by processing a particular input set of operations: while the subgroups generated by processing one set of operations (e.g. flushing the operations buffer at a particular time) will not overlap each other, they may overlap subgroups generated by processing a different set of vector type operations (e.g. flushing the operations buffer at a second time).

Within a given subgroup, however, the order in which the operations are processed is important. Specifically, the operations within a given subgroup are processed in the order they appeared in the original set of operations (e.g. in the operations buffer) which, in the present example is, depth order from rearmost to foremost.

In the context of the example page element format described above: position data for the new vector page element (e.g. the "top", "left", "width", "height" values) are calculated based on the operations making up the page element (e.g. based on the overall minimum and maximum x and y coordinates of the constituent vector type operations). Rotation and opacity for the new vector element are, in this particular example, set to zero. The vector drawing data for the new vector page element may be in any appropriate vector format. For example, SVG format data may be generated based on each vector type operation that is in the subgroup in question as well as the state operation(s) that are relevant to each vector type operation. The state operation(s) that are relevant to a given vector type operation are the state operation(s) that precede the given vector type operation in the original set of operations (e.g. the operations buffer). In certain cases an additional state operation (a transformation) may be added. To provide an example of this additional state operation, consider a subgroup consisting of a single element: a line extending from (100,200) to (300,400). In this case the conversion module 206 calculates that the element is 200×200 units wide and has an offset of 100,200. This offset is then taken into account when the line is added to the element, such that it would extend from (0,0) to (200,200).

Once a page element has been generated based on a drawing operation subgroup, the conversion module 206 adds that page element to the end of the set of page elements (e.g. by appending it to the set of page elements).

Once all subgroups have been converted into page elements, and those page elements have been appended to the set of page elements, processing proceeds to 718. In the present example, where the set of operations is an operations buffer generated by process 400, the conversion module 206 clears (e.g. deletes) all vector type operations from the operations buffer. As state operations are cumulative these are not deleted from the operations buffer. Process 700 is then complete.

Returning to 710, if the conversion module 206 determines if there is at least one open subgroup processing proceeds to 732 (FIG. 8).

Each time the conversion module 206 determines that there is at least one open subgroup, a processing loop (in this case involving operations 732, 734, 736, and 738) is performed. In this loop the conversion module 206 compares the currently selected vector type operation with each unprocessed open subgroup to determine if they overlap or not.

Accordingly, at 732 the conversion module 206 selects the next unprocessed open subgroup that the current vector type operation is to be compared to. Open subgroups can be processed in any order.

At 734, the conversion module 206 determines if the currently selected vector type operation overlaps the selected open subgroup. This involves comparing the vector type operation's expanded bounding box (as calculated 706) to the bounding box of the selected open subgroup (as retrieved from the subgroup's record) to determine if they overlap. The conversion module 206 can make this determination, for example, by use of a library function that takes two rectangles (or relevant coordinates thereof) and returns a value indicating whether the rectangles overlap or not.

If, at 734, the conversion module 206 determines that the vector type operation does not overlap with the currently selected subgroup, processing proceeds to 738.

If, at 734, the conversion module 206 determines that the vector type operation does overlap with the currently selected subgroup, processing proceeds to 736. At 736, the conversion module 206 adds the currently selected open subgroup to a merge list (creating the merge list if it does not already exist). In the present example, the merge list is a list (or array or other data structure) of subgroup identifiers. Processing then proceeds to 738.

At 738, the conversion module 206 determines whether there are any open subgroups that have not been processed for the currently selected vector type operation. If there are one or more unprocessed open subgroups, processing returns to 732 to select the next unprocessed open subgroup (and process it).

If all open subgroups have been processed for the current vector type operation, processing proceeds to 740. At 740, the conversion module 206 determines if the merge list is empty. If the merge list is empty (or no merge list has been created for the current vector type operation) this means that the current vector type operation has not overlapped with any open subgroups. In this case processing proceeds to 712 (FIG. 7) where a new subgroup is created for the current vector type operation (as described above).

If, at 740, the merge list includes one or more subgroups, processing proceeds to 742. At 742, the conversion module 206 merges the current vector type operation with the subgroup(s) defined in the merge list.

Merging the current vector type operation and subgroup(s) in the merge list can be performed in various ways. In the present embodiment, the conversion module 206 performs merging by creating a new subgroup record as follows:

| Field | Value |
|---|---|
| Subgroup identifier | New identifier created by the conversion module 206. |
| Subgroup state | Initialized to open (e.g. "open") |
| Subgroup vector type operation members | Array/list populated with the vector type operation identifier of the currently selected vector type operation along with all vector type operation identifiers associated with all subgroups that are being merged. |
| Subgroup bounding box | Calculated based on subgroup members. |

As noted, the bounding box for the new subgroup is calculated based on the expanded bounding boxes of the new subgroup's member vector type operations. For example:

| New subgroup bounding box coordinate | Calculation |
|---|---|
| Min x | Minimum (or equal minimum) min x of all member vector type operation expanded bounding boxes |
| Max x | Maximum (or equal maximum) max x of all member vector type operation expanded bounding boxes |
| Min y | Minimum (or equal minimum) min y of all member vector type operation expanded bounding boxes |
| Max y | Maximum (or equal maximum) max y of all member vector type operation expanded bounding boxes |

Where the conversion module 206 merges by creating a new subgroup the conversion module 206 also deletes the subgroups included in the merge list (given these have now been merged into a new subgroup).

In alternative embodiments, rather than merging by creating a new subgroup the conversion module 206 may merge by: selecting one of the subgroups in the merge list; adding the current vector type operation (and vector type operations of any other subgroups in the merge list) to that selected subgroup; recalculating the bounding box of the selected subgroup (as described above); deleting all other subgroups in the merge list.

At 744, following merging of the vector type operation and subgroup(s), the conversion module 206 deletes the merge list (or at least deletes the subgroup(s) added to it). Following deletion of the merge list, processing proceeds to 714 (FIG. 7) to determine whether further vector type operations in the set of operations require processing.

In process 700 as described above subgroups that are created (at 712) are associated with an open or closed state. This improves the efficiency of the processing as each vector type operation need only be compared with open subgroups (e.g. in the processing loop commencing at 732). In alternative implementations, however, areas that are created need not be associated with an open/closed state. In this case, though, each vector type operation needs to be compared with all subgroups that have been created which in most cases will increase the processing required.

Vector type operations are sorted at 704 so they can be easily processed in order. In alternative implementations sorting operation 704 can be omitted, in which case vector type operations (or vector type operation bounding boxes) are processed at each iteration in order to identify and select (at 706) the next unprocessed vector type operation in the requisite order.

As noted, if a different processing direction is used certain parts of process 700 are adapted to account for this. By way of example, if the processing direction was max x to min x, the conversion module 206 would sort vector type operations at 704 based on their expanded bounding box max x coordinates (highest max x to lowest max x) and determine that an open subgroup should be closed at 708 if the vector type operation's expanded bounding box max x was less than the open subgroup's bounding box min x.

Figure 9:
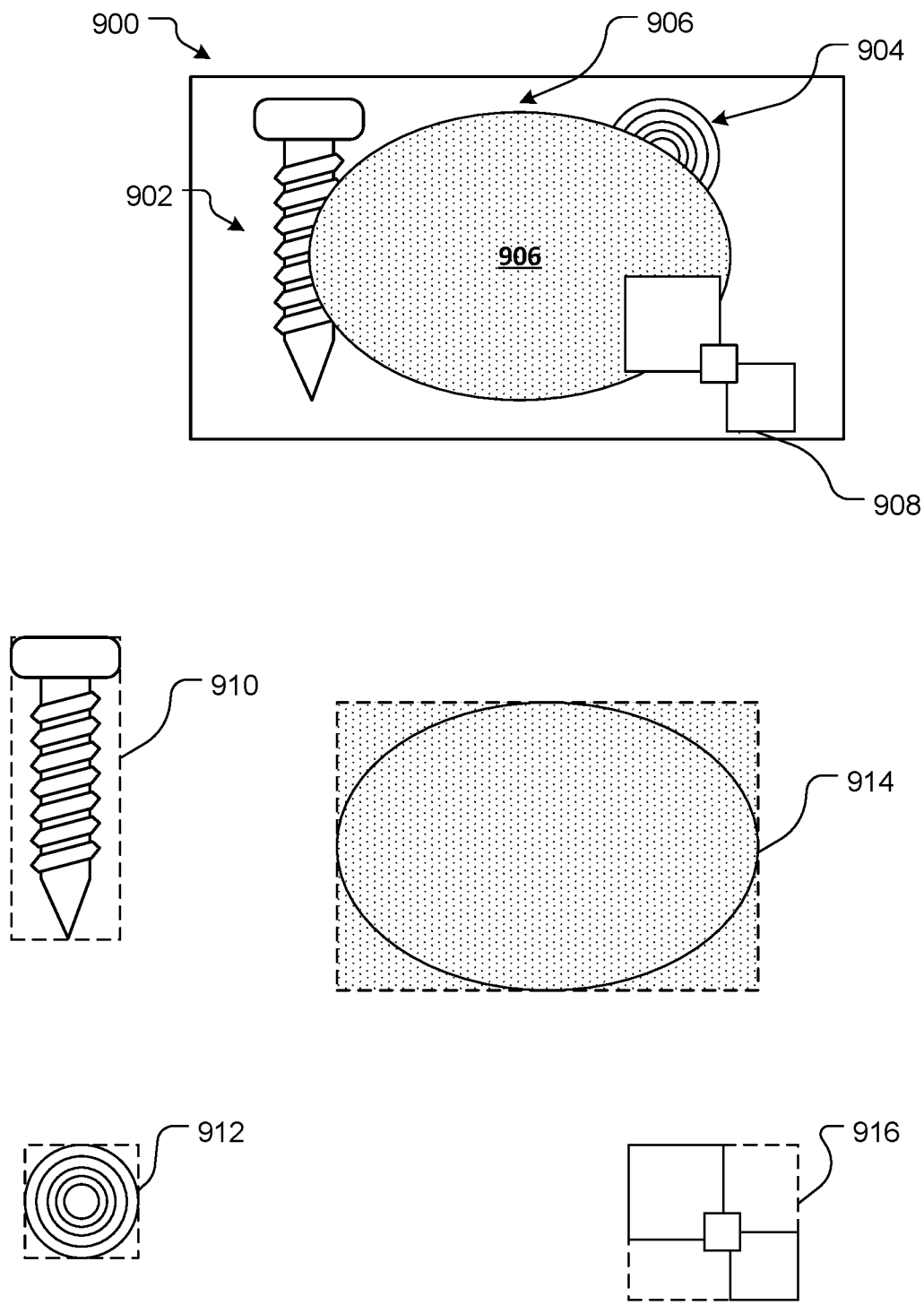
FIG. 9 provides another example page with vector and raster graphics.

To illustrate the operation of process 400 consider page 900 depicted in FIG. 9. Page 900 includes, in depth order: 48 line drawing elements indicated generally by reference 902 (the depth order of which being such that when rendered the operations generate a screw graphic such as screw 102 of FIG. 1); five circle vector type operations indicted generally by reference 904 (the individual depth order of which not being important for present purposes); a raster graphic 906 with an elliptical clipping path (similar to raster graphic 106 of FIG. 1); and three square vector type operations generally indicated by reference 908 (the individual depth order of which not being important for present purposes).

In processing page 900, the conversion module 206 would initially assign all 46 vector type operations 902 and all vector type operations 904 to the operations buffer before encountering the raster graphic 906.

On encountering the raster drawing graphic 906 the conversion module 206 would process the operations buffer according to process 700. The vector type operations 902 would be found to collectively overlap one another (and none of the vector type operations 904) and the vector type operations indicated by 904 would be found to collectively overlap each other (and none of the vector type operations indicated by 902). Accordingly, two subgroups of vector type operations would be formed: one subgroup including the vector type operations indicated by 902 (which would be used to generate one vector page element at 716); the other including the vector type operations indicated by 904 (which would be used to generate a separate vector page element at 716).

Having processed the operations buffer the conversion module 206 would clear the buffer at 718 and, at 444, generate a raster page element for the raster type operation 906.

Processing would then return to 416 and the conversion module 206 would add the three vector type operations indicated by 908 to the operations drawing buffer. The end of the input stream would then be reached (at 416) and the non-empty operations buffer processed at 462. In this case, the three vector type operations would be found to collectively overlap and therefore be assigned to a single subgroup which, in turn, would be used to generate a single vector page element (at 716).

Accordingly, at the completion of the conversion process, the conversion module 206 will have converted the 56 vector type operations and one raster type drawing operation into three vector page elements (910, 912, and 916) and one raster page element (914). Furthermore, the relative depths of these page elements matches their depths in the original data.

Generating page elements in this way is advantageous, particularly when compared with a process that does not determine vector type operation subgroups and instead creates separate page elements for every vector type operation.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, operations, steps, or elements.

Unless required by context, the terms "first", "second", etc. are used to differentiate between various elements and features and not in an ordinal sense. For example, a first vector type operation could be termed a second vector type operation, and, similarly, a second vector type operation could be termed a first vector type operation, without departing from the scope of the described examples.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method comprising:
   accessing, by a computer system comprising a processing unit, composite image data;
   processing the composite image data to generate an ordered stream of input operations, the ordered stream of input operations comprising vector type operations and raster type operations;
   creating a set of page elements for an editable document by:
      processing the ordered stream of input operations by, for each input operation:
         determining a type of the input operation;
         in response to determining that the input operation is a vector type operation, appending the vector type operation to an operations buffer; and
         in response to determining that the input operation is a raster type operation:
            flushing the operations buffer;
            creating a raster page element corresponding to the raster type operation; and
            appending the raster page element to the set of page elements;
      and wherein flushing the operations buffer comprises:
         processing one or more vector type operations in the operations buffer to generate one or more corresponding page elements;
         appending the one or more corresponding page elements to the set of page elements.

2. The computer implemented method of claim 1, wherein processing the one or more vector type operations in the operations buffer to generate the one or more corresponding page elements comprises:
   calculating an expanded bounding box for each vector type operation in the operations buffer;
   associating each vector type operation in the operations buffer with a subgroup, wherein a first subgroup is associated with one or more vector type operations which have collectively overlapping expanded bounding boxes; and
   processing the first subgroup to generate a first page element, wherein the first page element comprises drawing data based on each vector type operation associated with the first subgroup.

3. The computer implemented method of claim 2, wherein processing the first subgroup to generate the first page element comprises generating a first vector page element.

4. The computer implemented method of claim 2, wherein processing the first subgroup to generate the first page element comprises generating a first raster page element.

5. The computer implemented method of claim 2, wherein calculating the expanded bounding box for a given vector type operation comprises:
   determining an initial bounding box for the given vector type operation based on data associated with the given vector type operation; and
   applying an expansion factor to the initial bounding box to calculate the expanded bounding box.

6. The computer implemented method of claim 1, wherein the ordered stream of input operations further comprises a graphic state update type operations, and wherein:
   in response to determining that the input operation is the graphic state update type operation, processing the input operation comprises appending the graphic state update type operation to the operations buffer.

7. The computer implemented method of claim 6, wherein in response to determining that the input operation is the graphic state update type operation, processing the input operation further comprises updating a consolidated graphic state object based on the graphic state update type operation.

8. The computer implemented method of claim 1, wherein in response to determining that the input operation is the vector type operation processing the input operation comprises:

determining if the vector type operation is a supported vector type operation or an unsupported vector type operation; and in response to determining that the vector type operation is the unsupported vector type operation:
foregoing appending the vector type operation to the operations buffer;
flushing the operations buffer;
creating a new raster page element corresponding to the unsupported vector type operation; and
appending the new raster page element to the set of page elements.

9. The computer implemented method of claim 1, wherein the composite image data is portable document format data.

10. A computer implemented method comprising:
accessing, by a computer system comprising a processing unit, a set of operations, the set of operations comprising one or more vector type operations;
processing the set of operations to generate one or more corresponding page elements for an editable document by:
calculating an expanded bounding box for each vector type operation in the set of operations;
associating each vector type operation with a subgroup, wherein a first subgroup is associated with one or more vector type operations which have collectively overlapping expanded bounding boxes; and
processing the first subgroup to generate a first page element, wherein the first page element comprises drawing data based on each vector type operation associated with the first subgroup.

11. The computer implemented method of claim 10, wherein processing the first subgroup to generate the first page element comprises generating a first vector page element.

12. The computer implemented method of claim 10, wherein processing the first subgroup to generate the first page element comprises generating a first raster page element.

13. The computer implemented method of claim 10, wherein the expanded bounding boxes of vector type operations associated with the first subgroup do not overlap the expanded bounding boxes of any vector type operations that are associated with another subgroup.

14. The computer implemented method of claim 10, wherein the set of operations further comprises a graphic state update type operation, and wherein the drawing data for the first page element is further based on
the graphic state update type operations.

15. The computer implemented method of claim 10, wherein calculating the expanded bounding box for a given vector type operation comprises:
determining an initial bounding box for the given vector type operation based on data associated with the given vector type operation; and
applying an expansion factor to the initial bounding box to calculate the expanded bounding box.

16. A computer processing system comprising:
a processing unit;
a communication interface; and
non-transitory computer-readable storage medium storing instructions, which when executed by the processing unit, cause the processing unit to perform a method comprising:
accessing composite image data;
processing, by the processing unit, the composite image data to generate an ordered stream of input operations, the ordered stream of input operations comprising vector type operations and raster type operations;
creating a set of page elements for an editable document by:
processing the ordered stream of input operations by, for each input operation:
determining a type of the input operation;
in response to determining that the input operation is a vector type operation, appending the vector type operation to an operations buffer; and
in response to determining that the input operation is a raster type operation:
flushing the operations buffer;
creating a raster page element corresponding to the raster type operation; and
appending the raster page element to the set of page elements;
and wherein flushing the operations buffer comprises:
processing one or more vector type operations in the operations buffer to generate one or more corresponding page elements;
appending the one or more corresponding page elements to the set of page elements.

17. The computer processing system of claim 16, wherein processing the one or more vector type operations in the operations buffer to generate the one or more corresponding page elements comprises:
calculating an expanded bounding box for each vector type operation in the operations buffer;
associating each vector type operation in the operations buffer with a subgroup, wherein a first subgroup is associated with one or more vector type operations which have collectively overlapping expanded bounding boxes; and
processing the first subgroup to generate a first page element, wherein the first page element comprises drawing data based on each vector type operation associated with the first subgroup.

18. The computer processing system of claim 17, wherein calculating the expanded bounding box for a given vector type operation comprises:
determining an initial bounding box for the given vector type operation based on data associated with the given vector type operation; and
applying an expansion factor to the initial bounding box to calculate the expanded bounding box.

19. The computer processing system of claim 16, wherein the ordered stream of input operations further comprises a graphic state update type operations, and wherein:
in response to determining that the input operation is the graphic state update type operation, processing the input operation comprises appending the graphic state update type operation to the operations buffer.

20. The computer processing system of claim 16, wherein in response to determining that the input operation is the vector type operation, processing the input operation comprises:
determining if the vector type operation is a supported vector type operation or an unsupported vector type operation; and
in response to determining that the vector type operation is the unsupported vector type operation:
foregoing appending the vector type operation to the operations buffer;

flushing the operations buffer;
creating a new raster page element corresponding to the unsupported vector type operation; and
appending the new raster page element to the set of page elements.

* * * * *